(12) United States Patent
Schmid

(10) Patent No.: US 8,297,680 B2
(45) Date of Patent: Oct. 30, 2012

(54) DEVICE FOR REINFORCEMENT

(75) Inventor: Ralf Schmid, Karlsruhe/Grünwettersbach (DE)

(73) Assignee: Dr. Ing. h.c.F. Porsche AG (DE)

( * ) Notice: Subject to any disclaimer, the term of this patent is extended or adjusted under 35 U.S.C. 154(b) by 317 days.

(21) Appl. No.: 12/692,749

(22) Filed: Jan. 25, 2010

(65) Prior Publication Data

US 2010/0187840 A1 Jul. 29, 2010

(30) Foreign Application Priority Data

Jan. 23, 2009 (DE) .......................... 10 2009 005 866

(51) Int. Cl.
*B60R 19/02* (2006.01)

(52) U.S. Cl. .................................................... 296/102

(58) Field of Classification Search ............ 296/187.11, 296/189.09, 193.09, 193.03; 293/102, 155, 293/106, 114, 119
See application file for complete search history.

(56) References Cited

U.S. PATENT DOCUMENTS

| 4,811,979 | A | | 3/1989 | Peter et al. |
| 5,618,074 | A | * | 4/1997 | Weast ........................... 293/155 |
| 6,338,510 | B1 | * | 1/2002 | Kanamori et al. ............ 293/154 |
| 7,080,862 | B2 | * | 7/2006 | Suzuki et al. ................. 293/154 |
| 7,086,673 | B2 | * | 8/2006 | Connett et al. ............... 293/118 |
| 7,410,209 | B2 | * | 8/2008 | Clapie ...................... 296/193.09 |
| 7,766,402 | B2 | * | 8/2010 | Schmidt et al. .............. 293/117 |

FOREIGN PATENT DOCUMENTS

| DE | 3622483 A1 | 1/1988 |
| DE | 19724431 C1 | 10/1998 |
| DE | 102007010821 A1 | 9/2008 |
| DE | 102007034696 A1 | 1/2009 |
| EP | 0150636 A1 | 8/1985 |

* cited by examiner

*Primary Examiner* — Glenn Dayoan
*Assistant Examiner* — Pinel Romain
(74) *Attorney, Agent, or Firm* — Gerald E. Hespos; Michael J. Porco

(57) ABSTRACT

A device for the reinforcement of large-surface-area lateral sections of a rear bumper covering is effected by a supporting holder which is arranged pivotably on a load-bearing structure, is folded-in in a delivery position, is folded up in an assembly position and can be fastened with its free end to the vehicle body.

4 Claims, 3 Drawing Sheets

DEVICE FOR REINFORCEMENT

CROSS-REFERENCE TO RELATED APPLICATION

This application claims the priority, under 35 U.S.C. §119, of German application DE 10 2009 005 866.4, filed Jan. 23, 2009; the prior application is herewith incorporated by reference in its entirety.

BACKGROUND OF THE INVENTION

Field of the Invention

The invention relates to a device for the reinforcement of large-surface-area lateral sections of a rear bumper covering which is connected on the inside to a transversely oriented load-bearing structure, which is held on the vehicle body. The lateral sections of the load-bearing structure are arranged in a manner which corresponds to the large-surface-area lateral sections of the bumper covering.

Published, non-prosecuted German patent application DE 10 2007 010 821 A1 discloses a reinforcing component for a body of a vehicle, which reinforcing component can be fixed to a body component via releasable connecting measures.

SUMMARY OF THE INVENTION

It is accordingly an object of the invention to provide a device for reinforcement which overcomes the above-mentioned disadvantages of the prior art devices of this general type, which device can be mounted in a simple way and ensures a connection which is free from oscillations.

With the foregoing and other objects in view there is provided, in accordance with the invention a device for reinforcement of large-surface-area lateral sections of a rear bumper covering connected on an inside to a transversely oriented load-bearing structure, which is held on a vehicle body. Lateral sections of the load-bearing structure are disposed in a manner corresponding to the large-surface-area lateral sections of the bumper covering. The device contains a pivotable supporting holder connected to the lateral sections of the load-bearing structure and has a free end. The pivotable supporting holder is folded-in in a delivery position and can be folded up in an assembly position and can be fastened with the free end to the vehicle body.

The advantages which are mainly achieved by way of the invention include the fact that a supporting holder is integrated into a load-bearing structure in the delivery state of the load-bearing structure for a rear bumper covering of a motor vehicle. Moreover, oscillation and trembling of the load-bearing structure and the bumper covering are prevented in an advantageous way. This is achieved by a pivotable supporting holder being connected to the lateral sections of the load-bearing structure, which pivotable supporting holder is folded in with respect to the load-bearing structure in a delivery position and is folded up in an assembly position and can be fastened with its free end to the vehicle body.

For the optimum reinforcement of the lateral sections of the load-bearing structure, the supporting holder is arranged in an oblique plane at an angle α with respect to the lateral sections of the load-bearing structure.

In order that the supporting holder in the delivery position can be transferred into the assembly position in a simple method of assembly, there is provision according to the invention for the supporting holder to have a slotted opening for fastening to the vehicle body, into which slotted opening, in the folded-up assembly position, a threaded bolt which protrudes downwards from the vehicle body engages, and a securing nut is provided on the threaded bolt for fixing purposes.

For the rapid and unproblematic connection of the supporting holder to the threaded bolt by the supporting holder being folded up, there is provision according to the invention, furthermore, for the free upper end of the supporting holder to contain a head of U-shaped profile in cross section with a web and lateral limbs, and for the slotted opening to extend from one limb into the web and, in the assembly position, for the threaded bolt to assume a position at the end of the slotted opening in the web.

The supporting holder preferably is formed of a plastic material, is configured to be of U-shaped profile in cross section and has crosswise arranged reinforcing ribs on the inside. A supporting holder made from a metal material is also conceivable.

In order that the folded-away supporting holder can be deposited in a positioned manner, the supporting holder has a centrally arranged depositing part which bears against the load-bearing structure in the folded-away delivery position.

Other features which are considered as characteristic for the invention are set forth in the appended claims.

Although the invention is illustrated and described herein as embodied in a device for reinforcement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
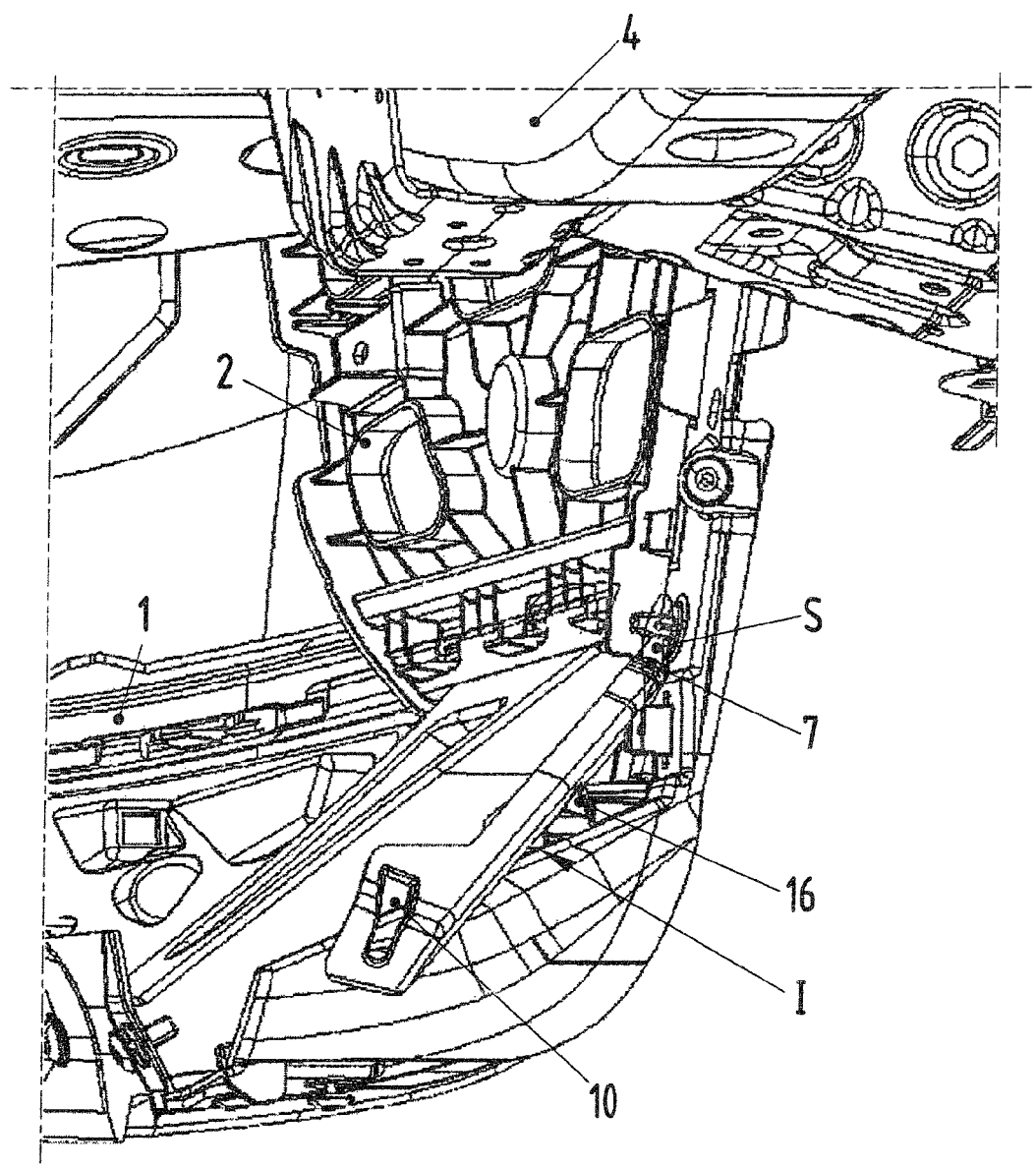
FIG. 1 is a perspective view of a supporting holder in a folded-away delivery position on a lateral load-bearing structure for a bumper covering according to the invention.
Figure 2:
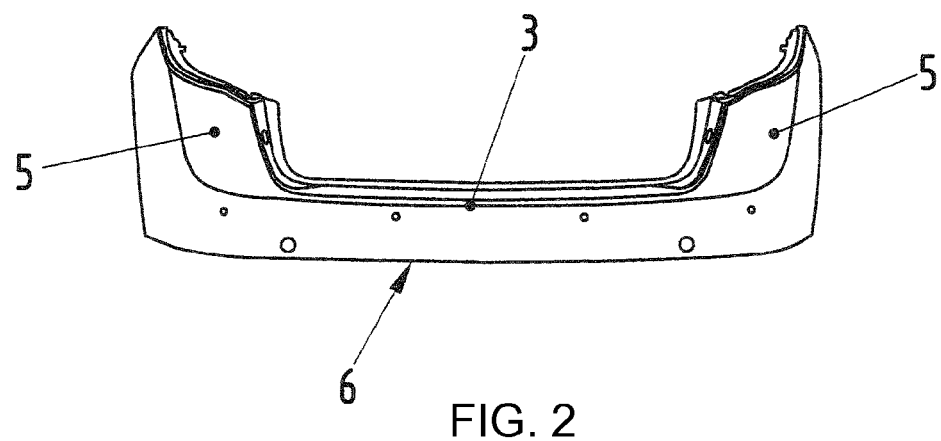
FIG. 2 is an illustration of the bumper covering as viewed from the outside.
Figure 3:
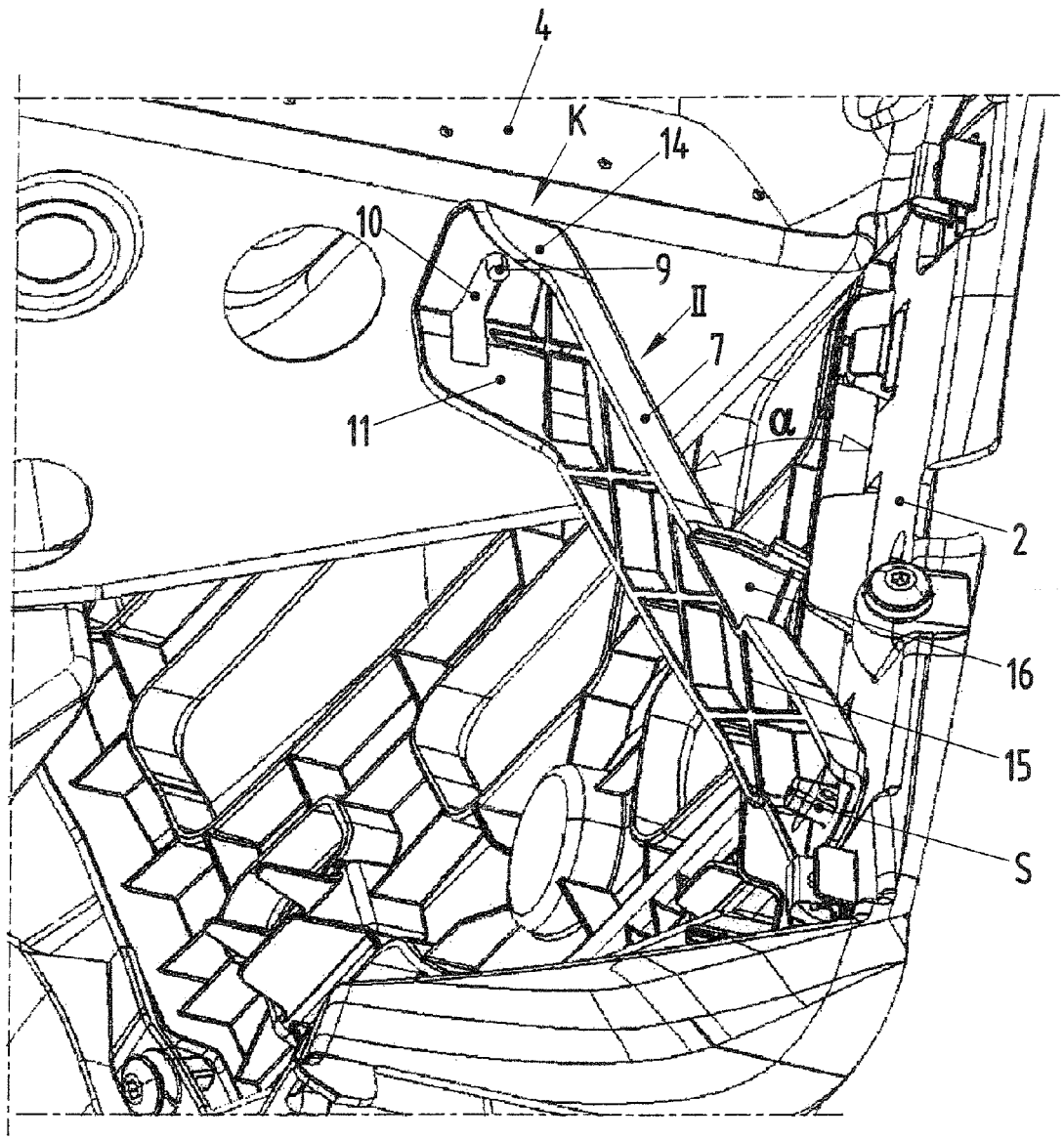
FIG. 3 is a perspective view of the supporting holder in the folded-up assembly position with a connection to the body structure.
Figure 4:
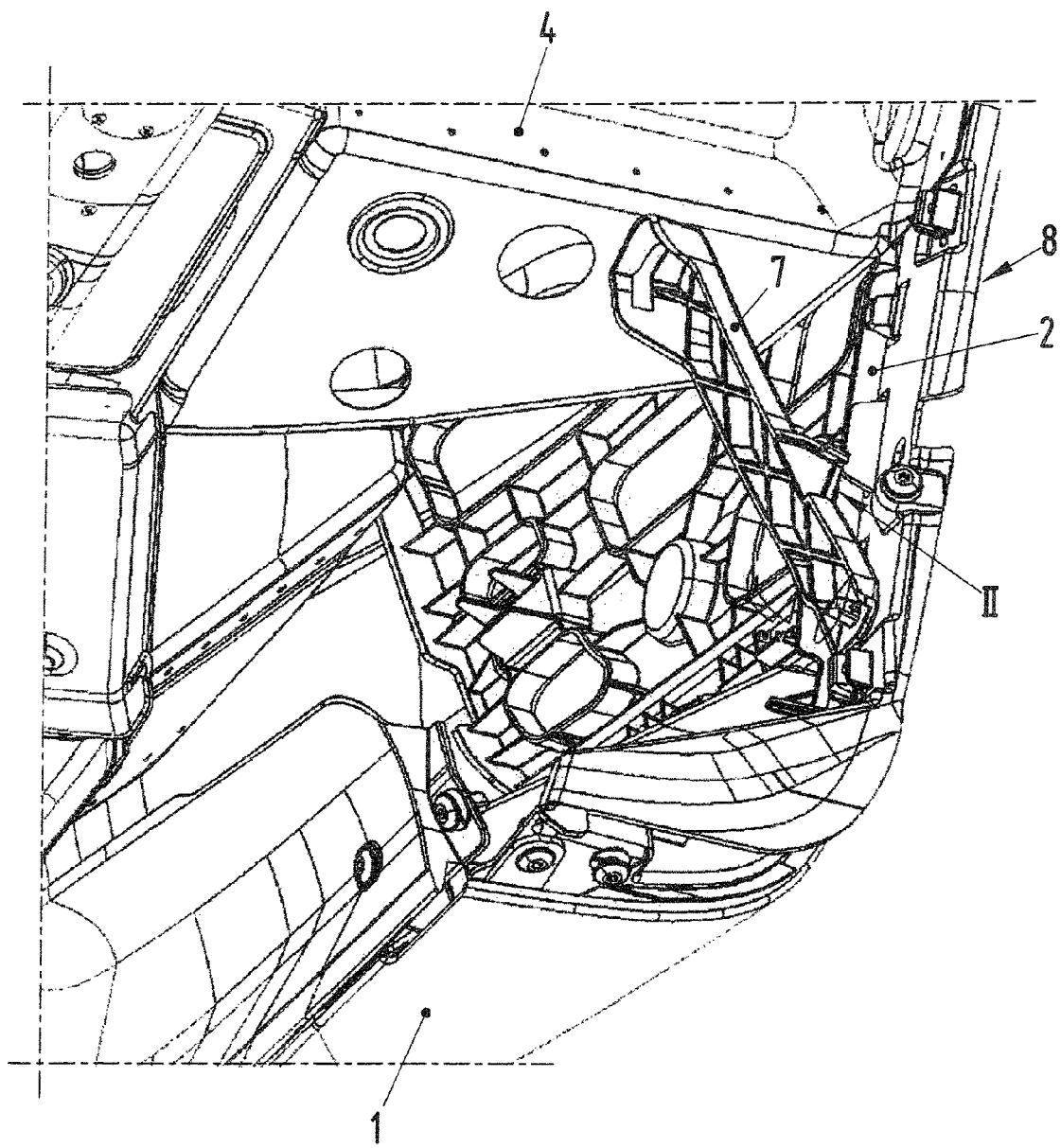
FIG. 4 is a further perspective view of the supporting holder in the folded-up assembly position.

Referring now to the figures of the drawing in detail and first, particularly, to FIGS. 1-4 thereof, there is shown a rear transversely oriented load-bearing structure 1 with laterally elevated sections 8 for receiving a bumper covering 3 which is placed onto it from the outside. The load-bearing structure 1 and 2 is connected to a vehicle body 4. The laterally elevated sections 8 of the load-bearing structure 2 are arranged in the region of elevated sections 5 of the bumper covering 3, whereas the load-bearing structure 1 lies in a central region 6 of the bumper covering 3.

A pivotably held supporting lever 7 which can be adjusted from a folded-in delivery position I (FIG. 1) into a folded-up assembly position 2 (FIG. 3) is connected to the lateral sections 8 of the load-bearing structure 2. In this position II, the supporting holder 7 is arranged in an oblique plane and at an angle α with respect to the load-bearing structure 2.

A slotted opening 10 is provided in a head K of the supporting holder 7, in order to fix the supporting holder 7 on the vehicle body 4, into which slotted opening 10 a threaded bolt 9 which protrudes from the vehicle body 4 and is connected to a threaded nut in order to secure the supporting holder 7 engages in the assembly position II.

The head K of the supporting holder 7 is configured to be of U-shaped profile in cross section and has a web 11 and lateral limbs 12 and 14. The slotted opening 10 extends from one limb 12 into the web 11 and, in the assembly position II, a threaded bolt 9 is held in a supported manner on the end side of the longitudinal slot of the slotted opening 10 in the web 11.

The supporting holder 7 is preferably produced from a plastic material, is configured to be of U-shaped profile in cross section and has crosswise arranged reinforcing ribs 15 on the inside. In order to deposit the supporting holder 7 in the delivery position I on the load-bearing structure 2, a depositing part 16 is arranged to the side of the supporting holder 7.

A pivot axis S of the supporting holder 7 on the load-bearing structure 2 is positioned in such a way that threading of the slotted opening 10 onto the threaded bolt 9 takes place in such a way that the threaded bolt 9 first of all passes the longitudinal slot in the limb 12 and subsequently enters the adjacent longitudinal slot of the slotted opening 10 in the web 11.

The invention claimed is:

1. A device for reinforcement of large-surface-area lateral sections of a rear bumper covering connected on an inside to a transversely oriented load-bearing structure, which is held on a vehicle body, and lateral sections of the load-bearing structure are disposed in a manner corresponding to the large-surface-area lateral sections of the bumper covering, the device comprising:

a pivotable supporting holder connected pivotably to the lateral sections of the load-bearing structure and having a free end, said pivotable supporting holder being pivotable between a folded-in delivery position and a folded up assembly position and can be fastened with said free end to the vehicle body;

said pivotable supporting holder having a slotted opening formed therein, a threaded bolt which protrudes downward from the vehicle body engages into said slotted opening when the pivotable supporting holder is in the folded-up assembly position for fastening the pivotable supporting holder to the vehicle body; and said pivotable supporting holder including a free upper end having a head of U-shaped profile with a web and lateral limbs, and said slotted opening extending from one of said lateral limbs into said web and the threaded bolt assuming a position at an end of said slotted opening in said web when the pivotable supporting holder is in the folded-up assembly position.

2. The device according to claim 1, wherein said pivotable supporting holder is disposed in an oblique plane at an angle with respect to the lateral sections of the load-bearing structure.

3. The device according to claim 1, wherein said pivotable supporting holder is formed from a plastic material, is configured to be of U-shaped profile and has crosswise disposed reinforcing ribs on an inside.

4. The device according to claim 1, wherein said pivotable supporting holder has a centrally arranged depositing part which bears against the load bearing structure in the folded-in delivery position.

* * * * *